(12) United States Patent
Okazaki (10) Patent No.: US 6,400,117 B2
(45) Date of Patent: Jun. 4, 2002

(54) SLIDER MECHANISM AND METHOD OF DRIVING THE SAME

(75) Inventor: Yuichi Okazaki, Ibaraki (JP)

(73) Assignee: Agency of Industrial Science & Technology, Ministry of International Trade & Industry, Tokyo (JP)

( * ) Notice: Subject to any disclaimer, the term of this patent is extended or adjusted under 35 U.S.C. 154(b) by 0 days.

(21) Appl. No.: 09/749,954

(22) Filed: Dec. 29, 2000

(30) Foreign Application Priority Data

May 26, 2000 (JP) ........................................ 2000-157035

(51) Int. Cl.$^7$ ................................................. G05B 1/06
(52) U.S. Cl. .................... 318/687; 318/575; 318/568.18
(58) Field of Search .............................. 318/575, 568.1, 318/568.18, 568.16, 568.2, 568.23, 687; 901/23, 46; 414/730

(56) References Cited

U.S. PATENT DOCUMENTS 6,194,859 B1 * 2/2001 Everman et al. .......... 318/568.2
6,232,736 B1 * 5/2001 Bullen ......................... 318/575

* cited by examiner

*Primary Examiner*—Khanh Dang
(74) *Attorney, Agent, or Firm*—Oblon, Spivak, McClelland, Maier & Neustadt, P.C.

(57) ABSTRACT

A slider mechanism includes two parallel guide rails, a first slider and a second slider constituted as separate members that are frictionally retained by and slidable along the guide rails, a first actuator for driving the first slider to change frictional force between it and the guide rails, a second actuator connecting the first and second sliders and adapted to move the second slider in the longitudinal direction of the guide rails, and a driving device for applying to the first actuator and second actuator a drive command that periodically produces a drive operation composed of four sequentially executed drive operation stages each consisting of a linear drive operation. A method of driving the slider mechanism includes a step of applying to the first actuator and second actuator a drive command that periodically produces a drive operation composed of four sequentially executed drive operation stages each consisting of a linear drive operation for operating the first actuator to change frictional force between the slider mechanism and the guide rails and operating the second actuator to move the second slider in the longitudinal direction of the guide rails.

8 Claims, 9 Drawing Sheets

SLIDER MECHANISM AND METHOD OF DRIVING THE SAME

BACKGROUND OF THE INVENTION

1. Field of the Invention

This invention relates to a slider mechanism for use in machine tools, measuring instruments and other machines and implements requiring precision linear motion and/or positioning capability and to a method of driving the slider mechanism.

2. Description of the Prior Art

Figure 14:
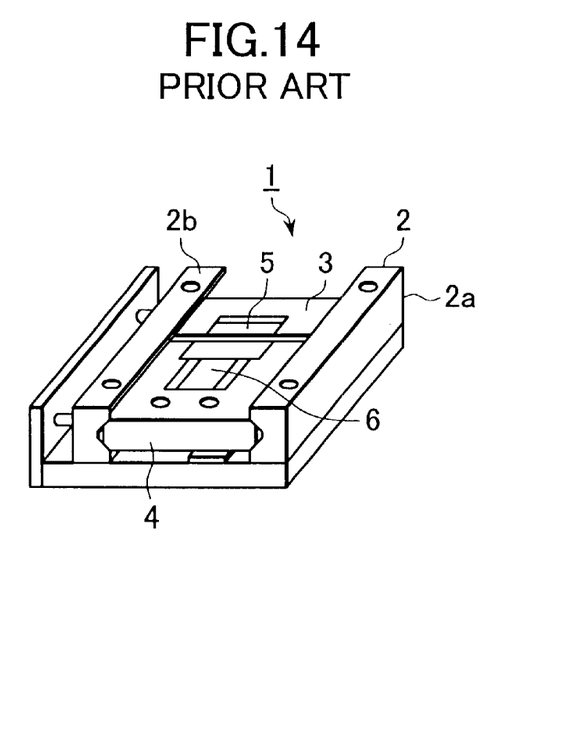
FIG. 14 is a perspective view showing the structure of a conventional slider mechanism.

FIG. 14 shows the structure of a small linear slider mechanism 1 of the type conventionally used in machine tools. This slider mechanism, taught by JP-A-HEI 10-166237 and known for its compact size and excellent rigidity, includes a pair of appropriately spaced parallel guide rails 2a, 2b, a first slider (clamp slider) 3 and second slider (main slider) 4 provided as separate units that slide between, and are frictionally retained by, the guide rails 2a and 2b, and a first displacement means (clamp actuator) 5 and second displacement means (feed actuator) 6 for clamping the first slider 3 on the guide rails and feeding the second slider 4 in the longitudinal direction of the guide rails.

Figure 15:
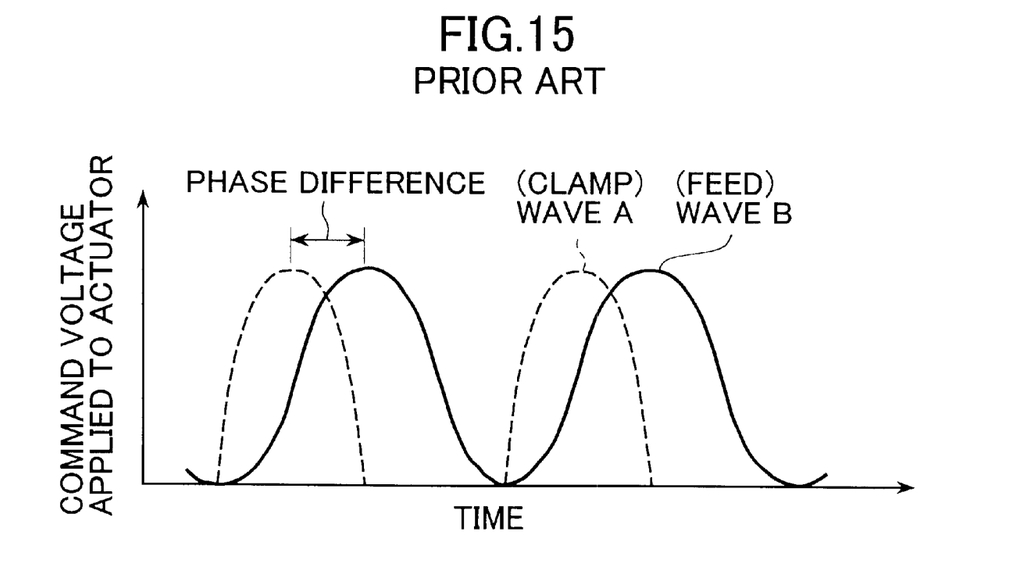
FIG. 15 is a diagram showing displacement command signals used to drive the conventional slider mechanism.

Periodic signals differing in phase are applied as displacement commands to the displacement means to produce respective clamping and feeding operations, thereby moving the sliders 3 and 4 by sequential guide rail clamping and feeding operations. The slider moving velocity is changed by changing the phase difference or period of the periodic signals. In the illustrated example, as shown in FIG. 15, the command for the clamp displacement means 5 is a halfsine wave (wave A) and the command for the feed displacement means 6 is a sinewave (wave B). The waves A and B have a certain phase difference.

Slider mechanisms used in miniaturized machine tools, measuring instruments and various other micromachines are required to move smoothly, i.e., with little velocity fluctuation. With the conventional driving method, however, the movement of the slider mechanism is intermittent. Momentary stopping, reversal of movement direction and the like make smooth operation impossible.

Figure 16:
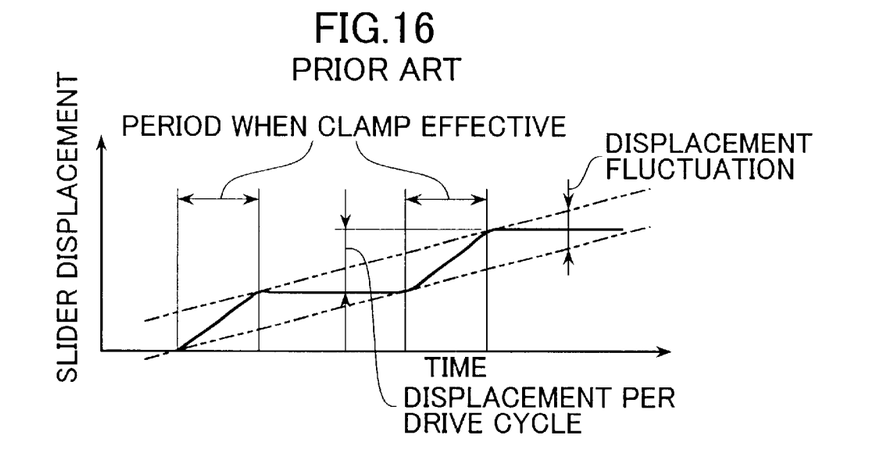
FIG. 16 is a diagram for explaining how displacement proceeds in the conventional slider mechanism.

FIG. 16 illustrates the movement of the conventional slider mechanism 1. Movement of the second displacement means (feed actuator 6) produces movement of the sliders 3 and 4 only during periods of first displacement means (clamp actuator 5) actuation and the sliders 3 and 4 remain stationary during periods when the clamp actuator 5 is not actuated. In other words, the sliders 3 and 4 move intermittently. Positional error relative to the constant velocity desired in response to the velocity command is therefore great.

Figure 17A:
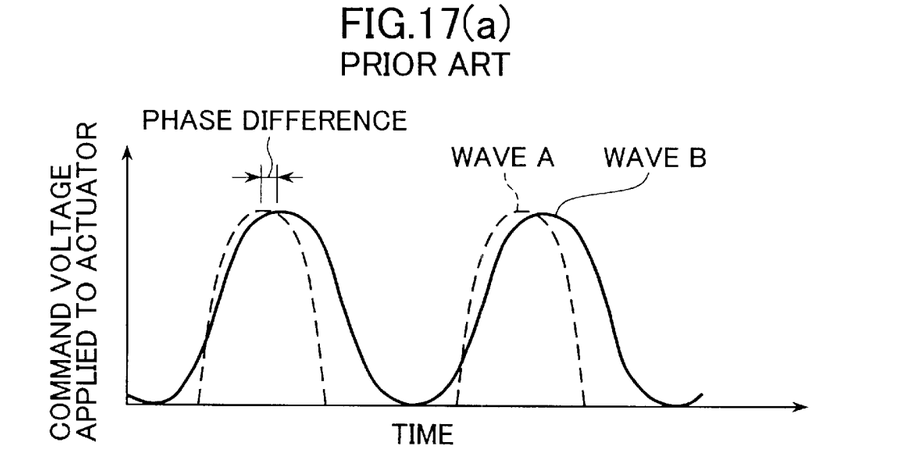
FIG. 17(a) is a diagram showing the waveforms of signals used to drive the conventional slider mechanism.
Figure 17B:
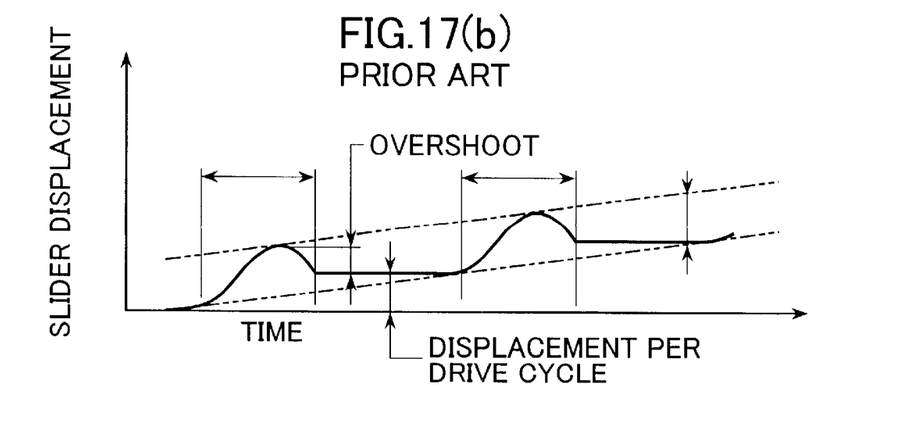
FIG. 17(b) is a diagram showing how the conventional slider mechanism operates when applied with the signals shown in FIG. 17(a).

The moving velocity of the sliders 3 and 4 can be changed by changing the phase difference of the signals for driving the two displacement means. When this method is adopted and, as shown in FIG. 17(a), a low-velocity command is produced by setting a small phase difference, the amount of overshoot (FIG. 17(b)) becomes large, the sliders 3 and 4 reciprocate back and forth, and the average velocity becomes low. The displacement fluctuation is large and smooth movement cannot be achieved. Moreover, as was pointed out above, the moving velocity does not vary linearly with respect to the applied phase difference.

The method of varying the moving velocity of the sliders 3 and 4 by varying the period of the drive signals applied to the displacement means involves numerous problems. Specifically, when a low-velocity command is issued, the average moving velocity declines but still consists of repeated stops and starts. Since the displacement fluctuation is therefore great, smooth movement cannot be achieved. Moreover, the resulting decrease in the response speed of the velocity control degrades the positional control response.

Another problem is that minute displacements smaller than the per-cycle slider displacement cannot be imparted. In order to utilize the command value to control the slider positions automatically, the control repetition period has to be made greater than the drive signal period. However, changing the drive signal period requires the automatic control period to be varied or greatly increased. This is very inconvenient.

The prior-art method of displacement control thus results in intermittent slider movement, is low in resolution, cannot achieve smooth movement, and is limited in degree of attainable positioning resolution.

This invention was accomplished in light of the foregoing drawbacks of the prior art and has as an object to provide a slider mechanism and a method of driving the slider mechanism that can, without need to vary the drive signal period, achieve smooth forward and reverse movement of the slider mechanism and linear speed control response relative to the speed command.

SUMMARY OF THE INVENTION

In order to achieve this object, the present invention provides a slider mechanism comprising two parallel guide rails, a first slider and a second slider constituted as separate members that are frictionally retained by and slidable along the guide rails, a first actuator for driving the first slider to change frictional force between it and the guide rails, a second actuator connecting the first and second sliders and adapted to move the second slider in the longitudinal direction of the guide rails, and drive command means for applying to the first actuator and second actuator a drive command signal that periodically produces a drive operation composed of four sequentially executed drive operation stages each consisting of a linear drive operation.

The invention further provides a method of driving a slider mechanism including two parallel guide rails, a first slider and a second slider constituted as separate members that are frictionally retained by and slidable along the guide rails, a first actuator associated with the first slider, and a second actuator connecting the first and second sliders, which method comprises a step of applying to the first actuator and second actuator a drive command signal that periodically produces a drive operation composed of four sequentially executed drive operation stages each consisting of a linear drive operation for operating the first actuator to change frictional force between the slider mechanism and the guide rails and operating the second actuator to move the second slider in the longitudinal direction of the guide rails.

The moving velocity of the second slider can be changed by varying the drive command signal applied to the second actuator in amplitude.

The means for applying the drive command signal can be means constituted for conducting position control comprising first and second displacement means, displacement detection means for producing a signal proportional to slider displacement, a compensator including at least a proportional element for obtaining an absolute value of a difference signal obtained by subtracting the signal produced by the displacement detection means from a displacement command signal, and a drive waveform generator responsive to the absolute value and ± sign of the difference signal for changing the shapes of drive command waveforms for the first and second displacement means and the amplitude of the drive command waveform for the second displacement means.

In the present invention, the first and second actuators are thus driven by application of a drive command signal that periodically produces a four-stage drive operation for producing a linear drive operation. The slider mechanism can therefore reliably achieve smooth forward and reverse movement and linear velocity control response to velocity commands.

The above and other objects and features of the present device will become apparent from the following description made with reference to the drawings.

DESCRIPTION OF THE PREFERRED EMBODIMENT

Figure 1A:
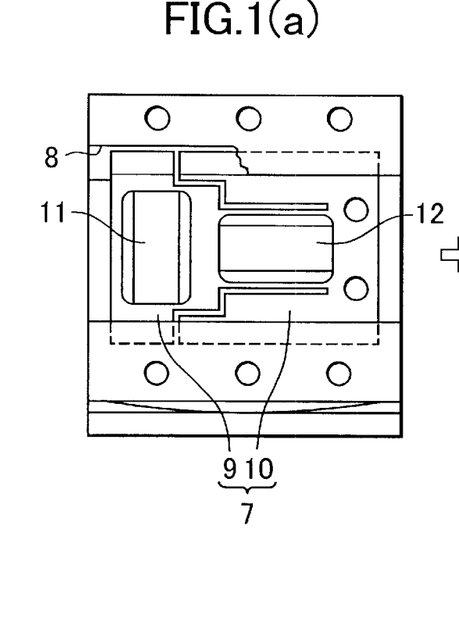
FIG. 1(a) is a top view, partially in section, showing the structure of a slider mechanism that is an embodiment of the present invention.
Figure 1B:
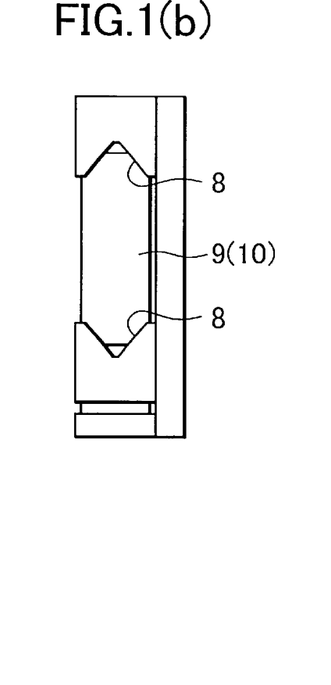
FIG. 1(b) is a side view of the slider mechanism shown in FIG. 1(a).

An embodiment of the slider mechanism and driving method according to the present invention will now be explained with reference to the drawings. FIG. 1 shows an embodiment of the invention slider mechanism. FIG. 1(a) is a top view of the slider mechanism in which a guide 8 is shown partially in section. FIG. 1(b) is a side view of the same slider mechanism.

The slider mechanism, designated by reference numeral 7, comprises a clamp slider 9 and a main slider 10 that are joined by a pair of blade-like portions and mounted to be slidable along a pair of laterally spaced guide rails 8. The clamp slider 9 is fitted with a clamp actuator 11 that expands (elongates) and contracts (shortens) the damp slider 9 perpendicularly to the guide rails 8 so as to clamp and release the guide rails 8. The clamp slider 9 and main slider 10 are further joined by a feed actuator 12 that expands and contracts against the pair of blade-like portions in parallel with the guide rails 8.

The basic operation of the slider mechanism will be explained. The clamp actuator 11 is operated to clamp and retain the clamp slider 9 relative to the guide rails 8. With this clamped state maintained, the feed actuator 12 is expanded to overcome the frictional force between the main slider 10 and the guide rails 8 and move the main slider 10 in the direction of the arrow. The clamp actuator 11 is then deactivated to release the clamping action and the feed actuator 12 is contracted. In this state the frictional force between the clamp slider 9 and the guide rails 8 is smaller than that of the main slider 10. The clamp slider 9 therefore moves in the direction of the arrow by the amount of contraction of the feed actuator 12. These operations are repeated to advance the slider mechanism 7 in the direction of the arrow.

(Forward drive pattern)

Figure 2:
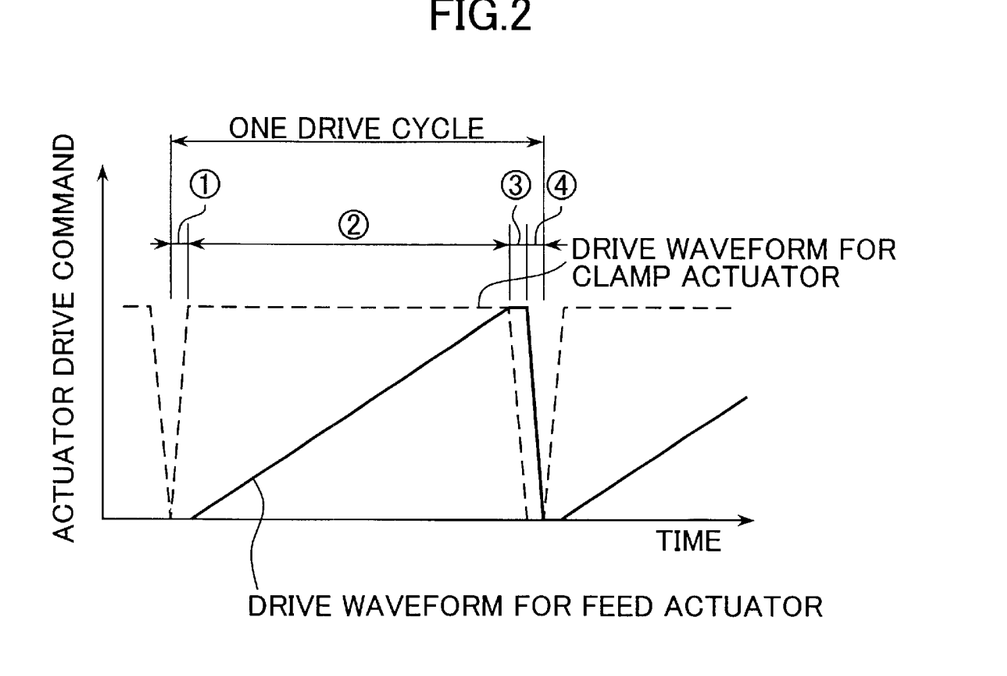
FIG. 2 is a diagram showing drive waveforms used for forward driving of the slider mechanism of the present invention.
Figure 3:
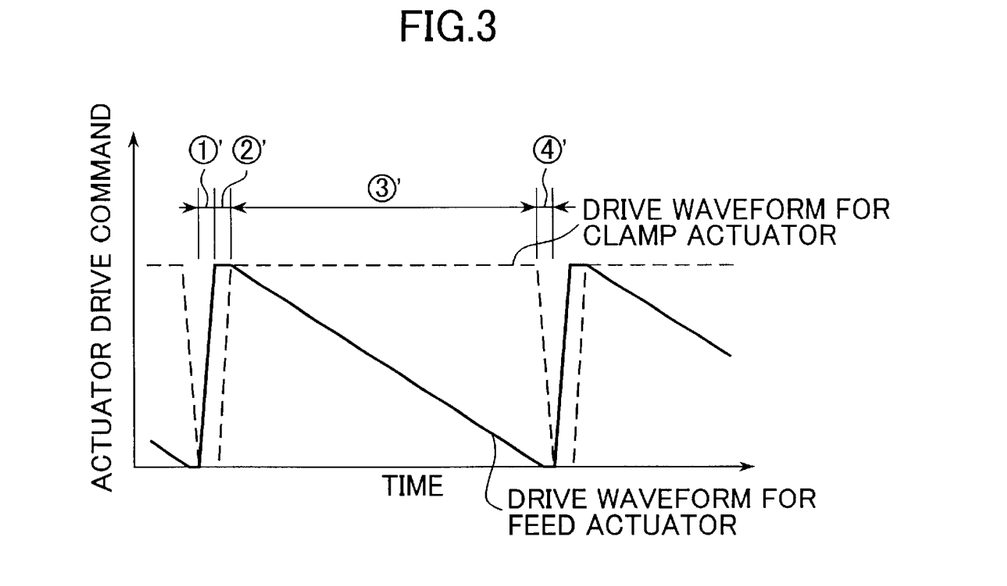
FIG. 3 is a diagram showing drive waveforms used for reverse driving of the invention slider mechanism.
Figure 4:
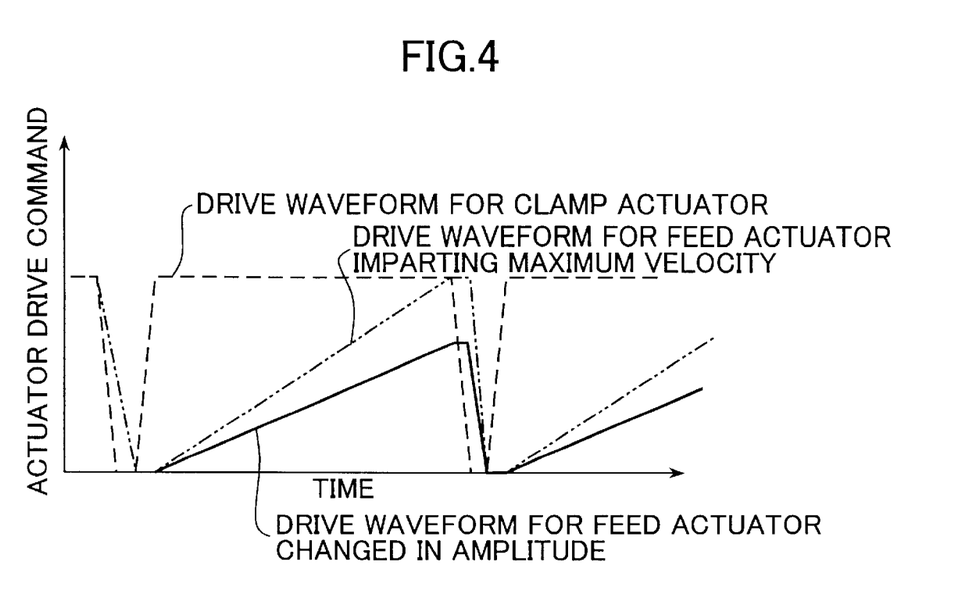
FIG. 4 is a diagram showing a method for controlling the moving velocity of the invention slider mechanism.

In the slider mechanism 7 and the method of driving the slider mechanism 7 according to the present invention, drive commands having the drive waveform patterns shown in FIGS. 2–4 are applied. In these figures, the dotted lines represent a drive waveform for the clamp actuator 11 and the solid lines indicated a drive waveform for the feed actuator 12.

As shown in FIG. 2, the sliders 9 and 10 are driven forward by applying to the clamp actuator 11 and the feed actuator 12 a drive command composed of a drive waveform pattern including the following four stages (1) to (4):

(1) Stage 1: The clamp actuator 11 is instantaneously displaced to press the clamp slider 9 against the guides and increase frictional force between the slider 9 and the guides.

(2) Stage 2: The feed actuator 12 is linearly displaced in the direction of pushing the main slider 10 away from the clamp slider 9.

(3) Stage 3: The clamp actuator 11 is instantaneously displaced to release the pressure of the clamp slider 9 on the guides.

(4) Stage 4: The feed actuator 12 is instantaneously displaced in the direction of drawing the damp slider 9 toward the main slider 10.

In Stage 1, the frictional force between the clamp slider 9 and the guide rails 8 is made greater than that between the main slider 10 and the guide rails 8. In Stage 2, therefore, the clamp slider 9 remains stationary while the propelling force produced by the feed actuator 12 overcomes the frictional force between the main slider 10 and the guides, thereby advancing the main slider 10. The time point at the end of Stage 4 marks the completion of one drive cycle during which the main slider 10 is displaced by a certain distance in the direction opposite from the clamp slider 9. The other stages are completed considerably more rapidly than Stage 2.

(Reverse drive pattern)

The direction of movement is reversed and backward movement effected by applying a drive command composed of a drive waveform pattern including the following four stages (1)' to (4)' that amount to conducting the preceding cycle in reverse time order:

(1)' Stage 1: The feed actuator 12 is instantly displaced in the direction of pushing the main clamp slider 9 away from the main slider 10.

(2)' Stage 2: The clamp actuator 11 is instantaneously displaced to press the clamp slider 9 against the guides and increase frictional force between the slider 9 and the guides.

(3)' Stage 3: The feed actuator 12 is linearly displaced in the direction of drawing the main slider 10 toward the clamp slider 9.

(4)' Stage 4: The clamp actuator 11 is instantaneously displaced to release the pressure of the clamp slider 9 on the guides.

The time point at the end of Stage 4 marks the completion of one drive cycle during which the main slider 10 is displaced by a certain distance in the direction of the clamp slider 9. The other stages are completely considerably more rapidly than Stage 3.

(Speed change)

The moving velocity in forward or reverse movement is changed by, as shown in FIG. 4, changing the magnitude of the displacement of the feed actuator 12 in the forward or reverse drive pattern concerned. This is achieved by multiplying the drive waveform that imparts maximum moving velocity to the feed actuator 12 (two-dot chain line) by the velocity reduction ratio of the velocity command and applying the resulting drive waveform (solid line) to the feed actuator 12 as a command.

(Displacement control)

Figure 5:
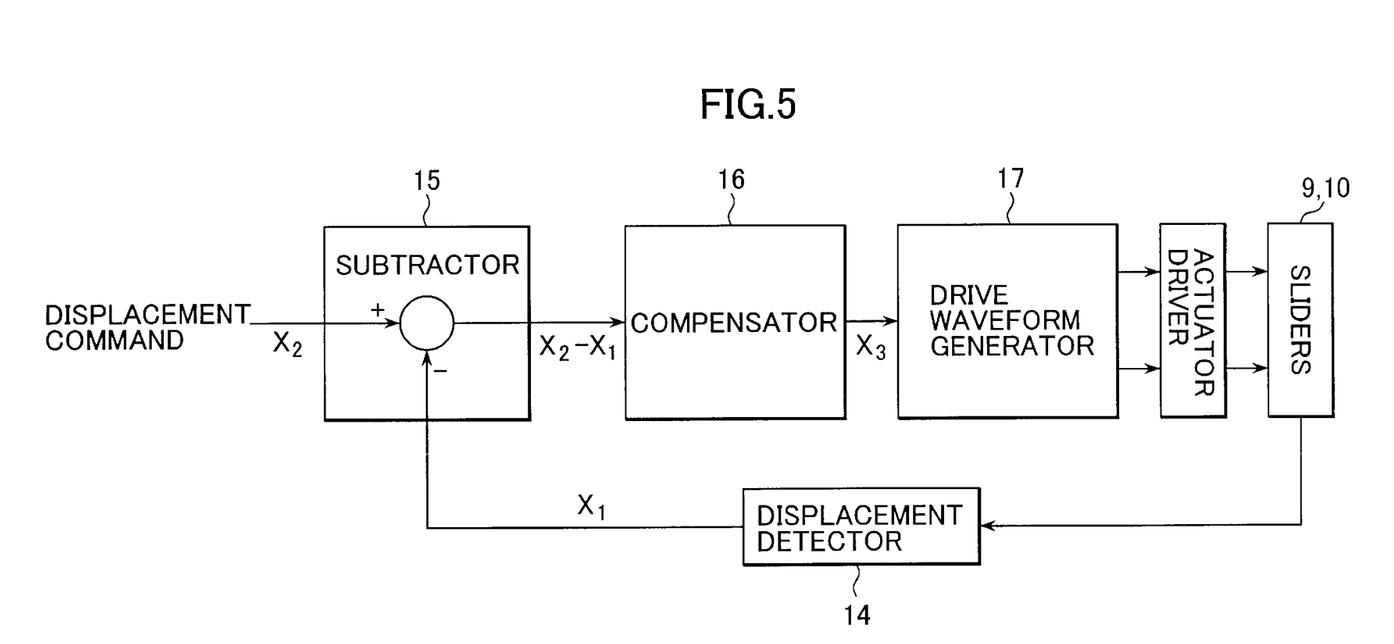
FIG. 5 is a diagram showing a displacement control system of the invention slider mechanism.

FIG. 5 is a block diagram for explaining a displacement control device 13 and the displacement control method of the present invention. A displacement signal x1 output by a displacement detector 14 for measuring displacement to the main slider 10 and a displacement command signal x2 are input to a subtractor 15. The subtractor 15 subtracts the displacement signal x1 from the displacement command signal x2 and outputs the difference x2−x1 to a compensator 16 as a tracking error. The compensator 16, which has a proportional element that increases the tracking error a certain number of times, outputs a velocity command value signal x3 based on the input tracking error. The velocity command value signal x3 obtained in this manner is forwarded to a drive waveform generator 17.

Based on the absolute value and ± sign of the velocity command value signal x3, the drive waveform generator 17 generates output waveform signals for the clamp actuator 11 and the feed actuator 12 during one drive cycle. More specifically, one of the drive waveform patterns for clamping and feeding that moves the main slider 10 in the direction of reducing the tracking error is selected, and the magnitude of the drive waveform for the feed actuator 12 is set in proportion to the absolute value of the velocity command.

The actuator drive waveform signals are sent through an actuator driver to the clamp actuator 11 and the feed actuator 12 to drive them in proportion to the signals, thereby moving the clamp slider 9 and the main slider 10 by a certain amount in the direction of reducing the tracking error. The output waveform signals for the next cycle are then generated by once again reading the tracking error from the subtractor 15 and passing it through the compensator 16 and drive waveform generator 17. The control thereafter proceeds by repeating this process. The proportional element of the compensator 16 is set as large as possible without destabilizing the slider movement.

Repetition of the foregoing cycle utilizing the drive waveform pattern drives the main slider 10 smoothly at a substantially constant velocity while minimizing displacement fluctuation. Moreover, the foregoing velocity control method makes it possible to change the amount of main slider displacement per drive cycle while maintaining minimal displacement fluctuation, without changing the drive waveform period. Linear velocity change can therefore be realized relative to the main slider velocity command value. This displacement control method enables displacement of the main slider to follow the command value.

The operational effect of the slider mechanism 7 and the method of driving the slider mechanism 7 of this embodiment will now be explained in further detail, also with reference to certain experimental results. The explanation will be made assuming that the actuators 11 and 12 are multilayer piezoelectric actuators and the detector 14 for detecting displacement of the main slider 10 is a linear scale.

Figure 6:
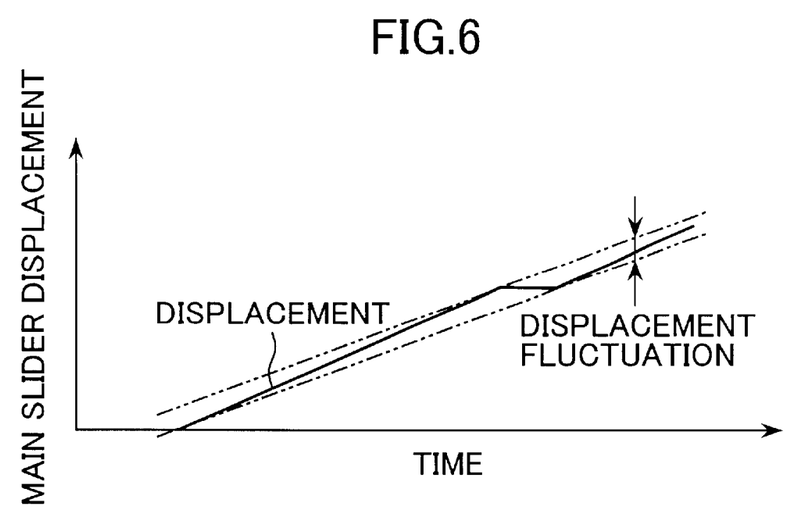
FIG. 6 is a diagram showing displacement fluctuation during movement of the invention slider mechanism.

As shown in FIG. 6, the displacement of the slider mechanism 7 according to the invention (slider displacement (movement) over time) exhibits little fluctuation. Smooth slider movement can therefore be realized.

Figure 7:
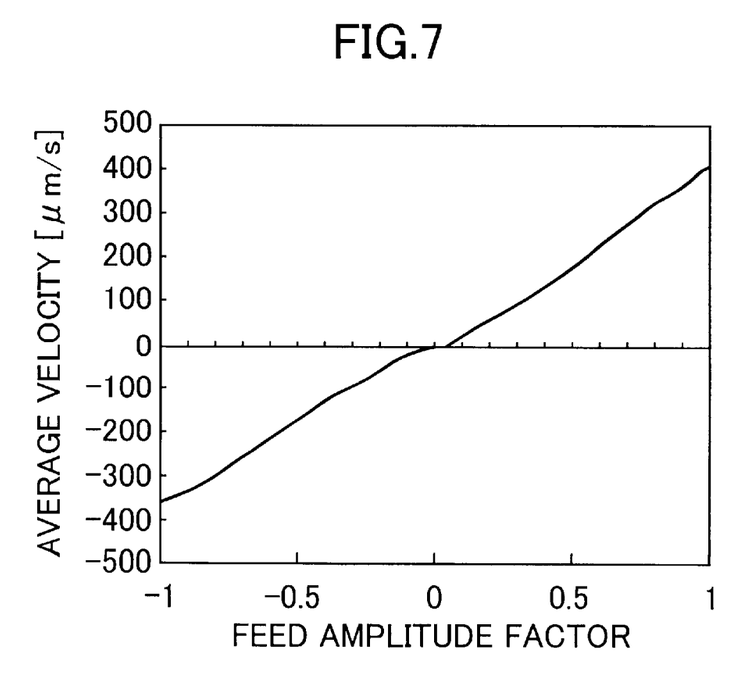
FIG. 7 is a diagram showing moving velocity control characteristic in an embodiment of the present invention.

The graph of FIG. 7 shows how average slider mechanism moving velocity varies as a function of velocity command value in the present invention. The horizontal axis is scaled for command velocity relative to maximum velocity (feed amplitude factor). As can be seen from the graph, in this invention the average moving velocity of the sliders 9 and 10 varies smoothly and linearly with the velocity command value.

Figure 8:
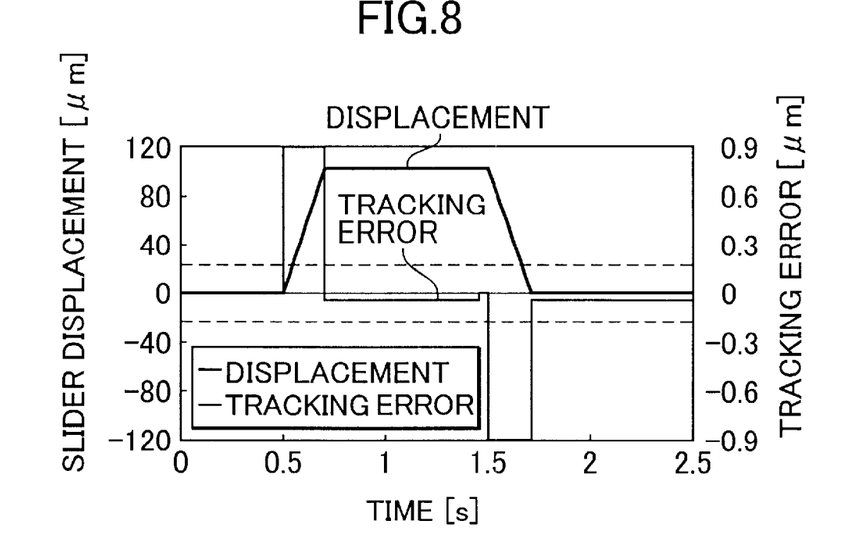
FIG. 8 is a diagram showing displacement control response.
Figure 9:
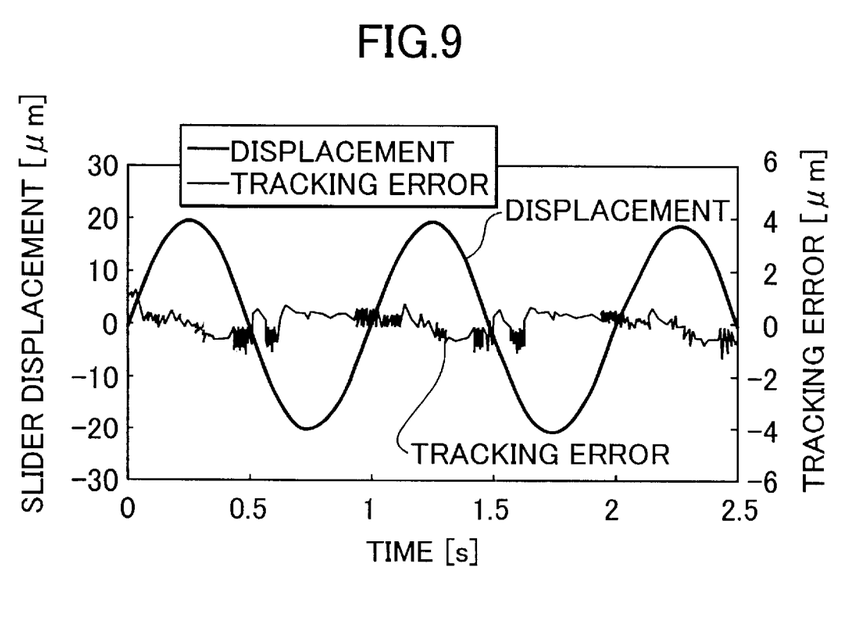
FIG. 9 is a diagram showing displacement control response (response to a sinusoidal displacement command signal).

An example of displacement control according to the invention is shown in FIG. 8. The main slider 10 responds to stepwise displacement commands at maximum velocity and deviation from the command value quickly converges to within 0.2 $\mu$m. FIG. 9 also shows an example of displacement control. Displacement follows a high-frequency displacement command applied in the form of a sinusoidal wave without deviating from the command value by more than 5%.

Figure 10:
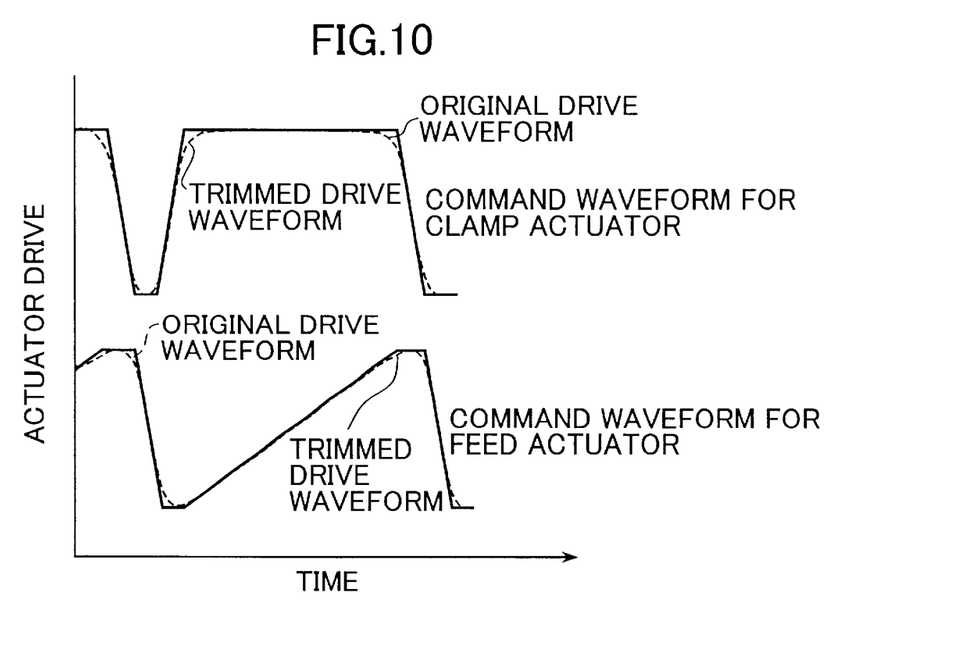
FIG. 10 is a diagram showing form-trimmed actuator drive waveforms in a modified embodiment of the present invention.

A modification of the foregoing embodiment will now be explained with reference to FIGS. 10 to 13. FIG. 10 shows an example of using shape-trimmed actuator drive waveforms for the clamp actuator 11 and the feed actuator 12. The slider mechanism used has a longitudinal length of 22 mm and a lateral length of 25 mm. A drive waveform including a sharp velocity change produces excessively rapid acceleration that becomes a cause of vibration and noise. Moreover, by producing an excessively large driving force in the actuator, such a drive waveform places a large load on the actuator and the drive mechanism. In one aspect of the present invention, therefore, these adverse effects are mitigated by slightly rounding the sharp corners of the drive waveform. This expedient can be adopted with substantially no impairment of the features of the invention explained in the foregoing.

Figure 11:
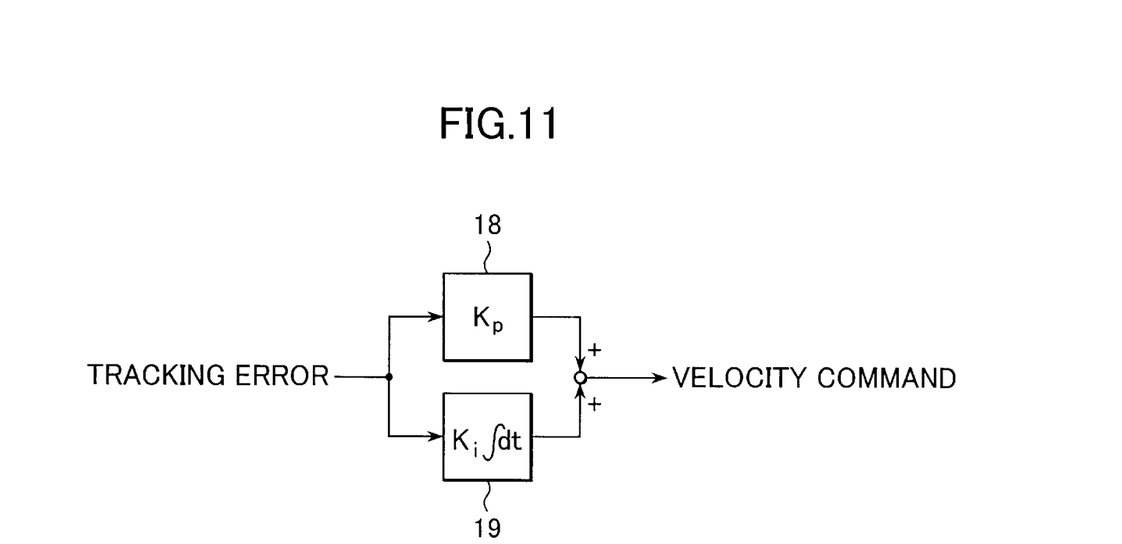
FIG. 11 is a diagram showing a compensator additionally provided with a proportional element in a modified embodiment of the present invention.

As shown in FIG. 11, the compensator 16 of the displacement control device 13 (FIG. 15) can be configured to include not only a proportional element 18 but also an integration factor 19. This reduces the tracking error of the slider mechanism 7 relative to the drive command value.

Figure 12:
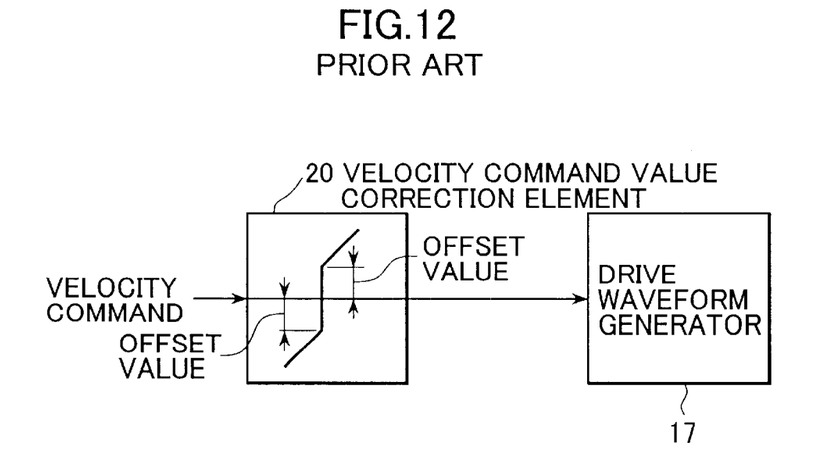
FIG. 12 is a diagram showing a compensating element for improving velocity response characteristic in a modified embodiment of the present invention.

As in existing technologies, the velocity response characteristic of the slider mechanism and drive method of this invention also includes a tiny dead zone in the vicinity of the zero-vicinity point. This can be effectively compensated for by inserting a velocity command value correction element 20 (FIG. 12) for correcting the velocity command value between the compensator 16 and the drive waveform generator 17. As shown in FIG. 12, the velocity command value correction element 20 adds a certain offset value to the input velocity command value signal in accordance with the ± sign thereof.

Figure 13:
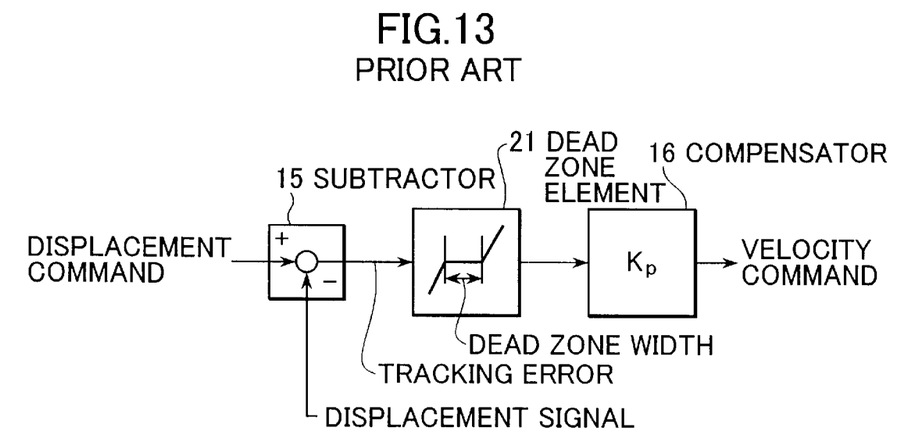
FIG. 13 is a diagram showing a dead zone element for improving stability in a modified embodiment of the present invention.

As illustrated in FIG. 13, in another aspect of the invention directed at enhancing the stability of the displacement control system when static, a dead zone element 21 is inserted between the subtractor 15 and the compensator 16. After the displacement has substantially reached the displacement command value, deviation still remains that is a function of the displacement detector 14 resolution and/or the slider mechanism 7 displacement resolution. Vibration may occur as the system attempts to reduce the deviation to zero. This can be effectively suppressed by setting the dead zone width equal to or greater than the amplitude of the vibration.

The present invention has been shown and described with reference to a specific embodiment. However, it should be noted that the present invention is in no way limited to the details of the described arrangements but changes and modifications may be made without departing from the scope of the appended claims.

The slider mechanism and method of driving the slider mechanism configured in accordance with the present invention in the foregoing manner achieve the following advantageous effects by use of a displacement signal composed of a four-stage drive waveform pattern:

(1) The slider mechanism can achieve sliding movement of high smoothness that can be maintained even at low velocity.

(2) The slider mechanism can realize velocity control that is faithful to the velocity command value. Since the repetition period of the drive waveform pattern is fixed, the response speed is constant at all moving velocities up to the maximum.

(3) The fact that the repetition period of the drive waveform pattern is fixed makes it easy to synchronize a velocity command value that varies once every prescribed time period with the drive control.

(4) Displacement control capable of following changing displacement command values can be realized in a precision slider mechanism.

What is claimed is:

1. A slider mechanism comprising:

two parallel guide rails;

a first slider and a second slider constituted as separate members that are frictionally retained by and slidable along the guide rails;

a first actuator for driving the first slider to change frictional force between it and the guide rails;

a second actuator connecting the first and second sliders and adapted to move the second slider in the longitudinal direction of the guide rails; and drive command means for applying to the first actuator and second actuator a drive command signal that periodically produces a drive operation composed of four sequentially executed drive operation stages each consisting of a linear drive operation.

2. A slider mechanism according to claim 1, wherein a moving velocity of the second slider is changed by varying the drive command signal applied to the second actuator in amplitude.

3. A slider mechanism according to claim 1, wherein the drive command means comprises first and second displacement means, displacement detection means for producing a signal proportional to slider displacement, a compensator including at least a proportional element for obtaining an absolute value of a difference signal obtained by subtracting the signal produced by the displacement detection means from the displacement command signal, and a drive waveform generator responsive to the absolute value and ± sign of the difference signal for changing shapes of drive command waveforms for the first and second displacement means and an amplitude of the drive command waveform for the second displacement means to conduct position control of the sliders.

4. A slider mechanism according to claim 2, wherein the drive command means comprises first and second displacement means, displacement detection means for producing a signal proportional to slider displacement, a compensator including at least a proportional element for obtaining an absolute value of a difference signal obtained by subtracting the signal produced by the displacement detection means from the displacement command signal, and a drive waveform generator responsive to the absolute value and ± sign of the difference signal for changing shapes of drive command waveforms for the first and second displacement means and an amplitude of the drive command waveform for the second displacement means to conduct position control of the sliders.

5. A method of driving a slider mechanism including two parallel guide rails, a first slider and a second slider constituted as separate members that are frictionally retained by and slidable along the guide rails, a first actuator operated by a first displacement means and associated with the first slider, and a second actuator operated by a second displacement means con connecting the first and second sliders, the method comprising: a step of applying to the first actuator and second actuator a drive command signal that periodically produces a drive operation composed of four sequentially executed drive operation stages each consisting of a linear drive operation for operating the first actuator to change frictional force between the slider mechanism and the guide rails and operating the second actuator to move the second slider in the longitudinal direction of the guide rails.

6. A method of driving a slider mechanism according to claim 5, wherein the moving velocity of the second slider is controlled by varying the drive waveform applied to the second actuator in amplitude.

7. A method of driving a slider mechanism according to claim 5, wherein slider position is controlled by utilizing displacement detection means to obtain a signal proportional to slider displacement, inputting to a compensator including at least a proportional element a difference signal obtained by subtracting the signal produced by the displacement detection means from the displacement command signal to obtain an absolute value, and utilizing a drive waveform generator responsive to the absolute value and ± sign of the difference signal to change shapes of drive waveforms for the first and second displacement means and an amplitude of the drive waveform for the second actuator.

8. A method of driving a slider mechanism according to claim 6, wherein slider position is controlled by utilizing displacement detection means to obtain a signal proportional to slider displacement, inputting to a compensator including at least a proportional element a difference signal obtained by subtracting the signal produced by the displacement detection means from the displacement command signal to obtain an absolute value, and utilising a drive waveform generator responsive to the absolute value and ± sign of the difference signal to change shapes of drive waveforms for the first and second displacement means and an amplitude of the drive waveform for the second actuator.

* * * * *